June 29, 1965
B. L. FALET ETAL
3,192,147
MULTI-CELL ELECTRODIALYZING APPARATUS
Filed Aug. 23, 1956
6 Sheets-Sheet 1
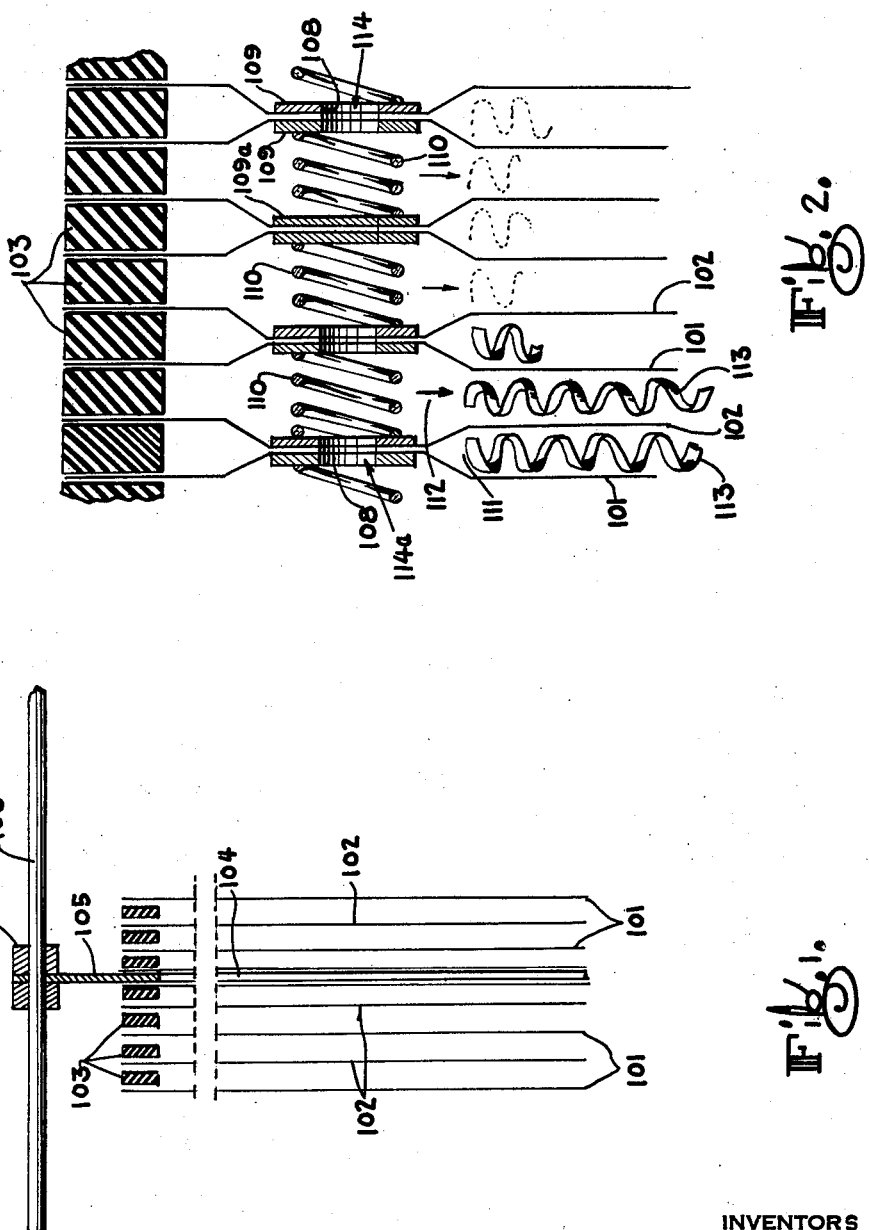
INVENTORS
BERNARD LUCIEN FALET
AREND HUBRECT DE HAAS VAN DORSSER
GERRIT FLORIS VAN DER STOEF
BY
ATTORNEYS

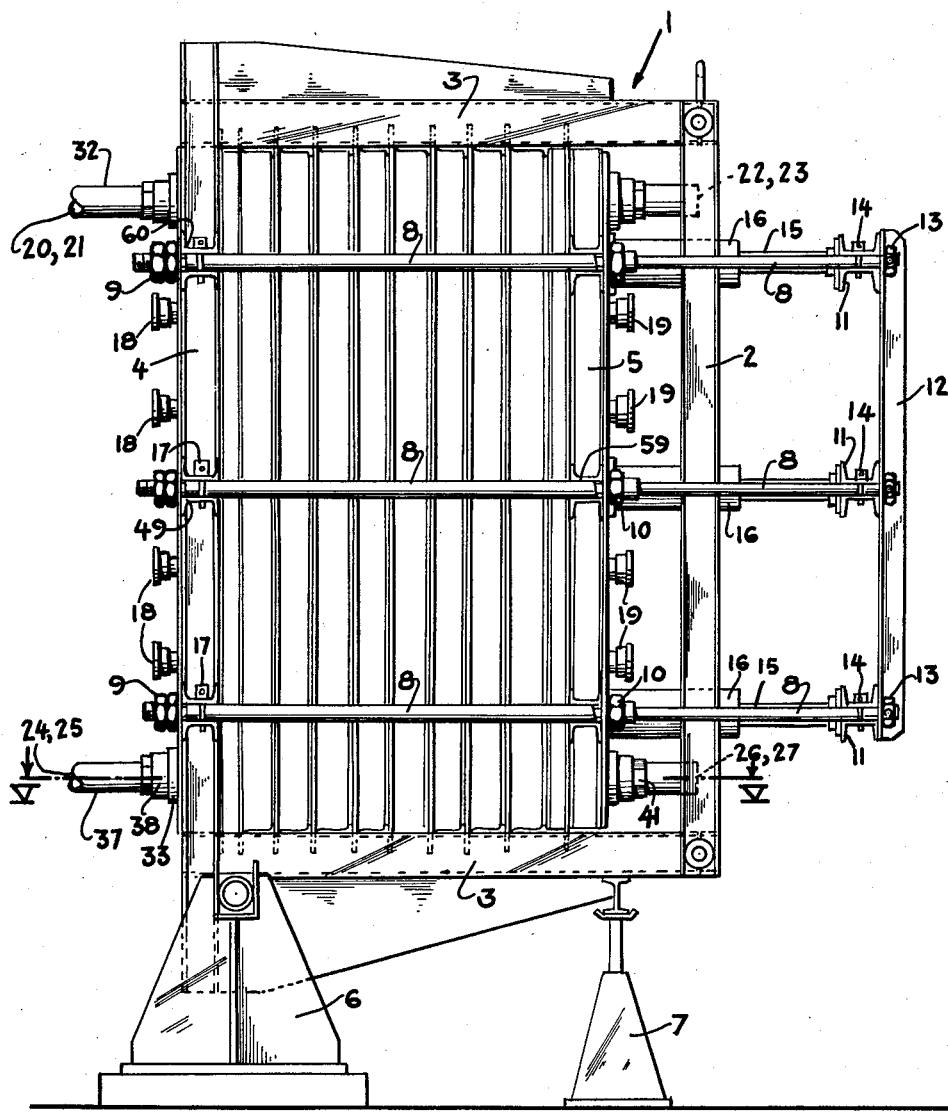

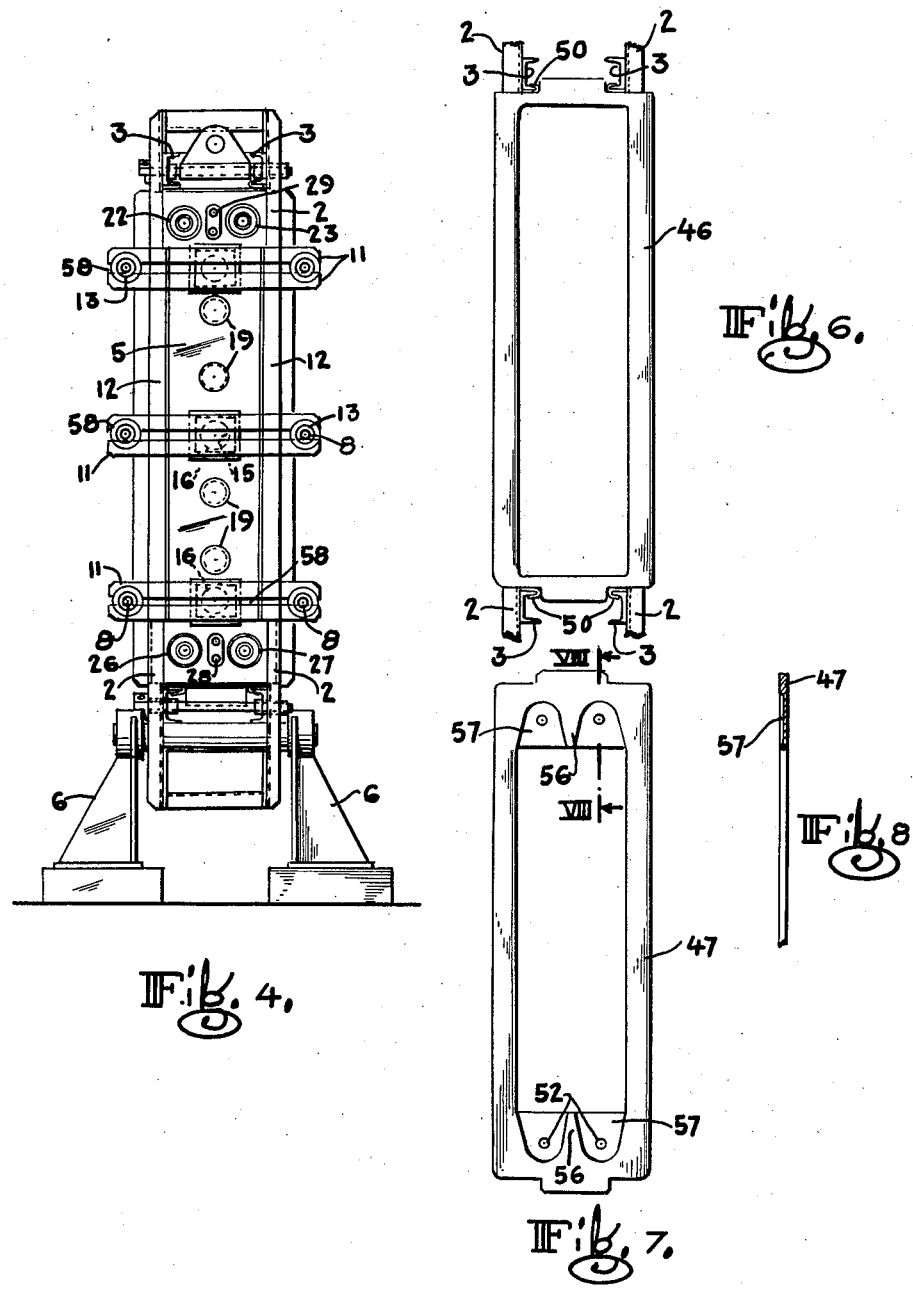

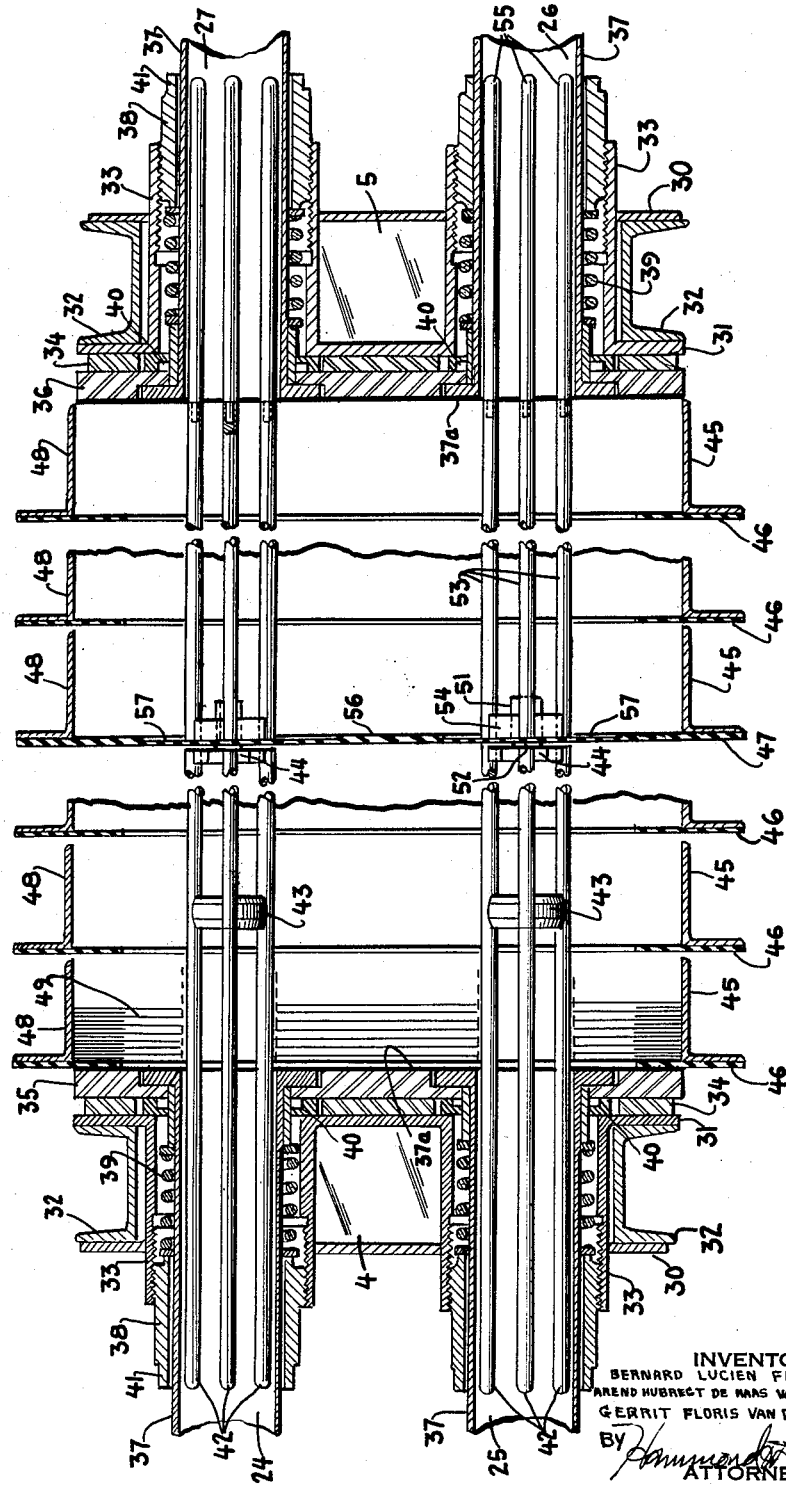

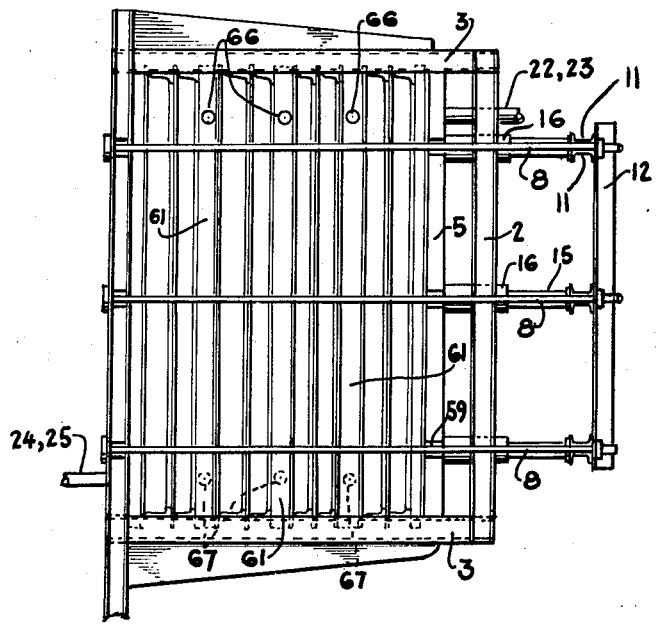
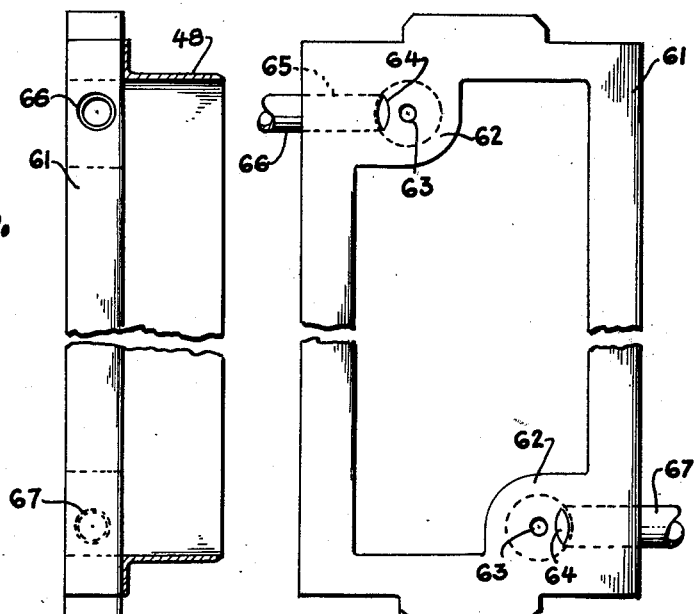

June 29, 1965  B. L. FALET ETAL  3,192,147
MULTI-CELL ELECTRODIALYZING APPARATUS
Filed Aug. 23, 1956  6 Sheets-Sheet 6

INVENTORS
BERNARD LUCIEN FALET
AREND HUBRECT DE HAAS VAN DORSSER
GERRIT FLORIS VAN DER STOEP
BY
ATTORNEYS

3,192,147
MULTI-CELL ELECTRODIALYZING APPARATUS
Bernard Lucien Falet and Arend Hubregt de Haas van Dorsser, The Hague, and Gerrit Floris van der Stoep, Rijswijk, Netherlands, assignors to Nederlandse Organisatie voor Toegepast-Natuurwetenschappelijk Onderzoek ten Behoeve van Nijverheid, Handel en Verkeer, The Hague, Netherlands
Filed Aug. 23, 1956, Ser. No. 605,813
Claims priority, application Great Britain, Aug. 25, 1955, 24,473/55
2 Claims. (Cl. 204—301)

This invention relates to an improved multi-cell continuous electrodialysis apparatus for the passage of ions from one stream of liquid into another stream, examples of the use of such apparatus are for desalting or concentrating liquids by ion exchange therebetween. Such apparatus contains a series of alternate dialysis and rinsing cells formed between the anode chamber and the cathode chamber, by spaced alternately arranged positive and negative membranes, through which cells dialysate and rinsing liquids respectively are passed.

This general type of a multi-cell apparatus is known from the U.S. Patent No. 2,735,812 and from the U.S. patent application Serial No. 380,831, filed September 17, 1953 now U.S. Patent No. 2,758,083, both assigned to the assignee of this invention.

Generally, such an apparatus comprises an anode in an anode cell provided with a rinsing liquid inlet and outlet. This anode cell is separated from the adjoining cell by an anion permeable membrane. This adjoining cell has on its side opposite the anion permeable membrane, a cation permeable membrane by which it is separated from a third cell, and so on. By such a series of spaced alternately arranged anion permeable membranes and cation permeable membranes defining cells therebetween, a series of alternate concentrating and diluting cells is formed. At the end of this membrane stack a cathode cell is provided containing the cathode and an inlet and outlet for the cathode wash liquid.

The anion and cation permeable membranes may be supported and spaced apart by spacers of corrugated perforated rigid material, such as polyvinyl chloride in the manner described in U.S. Patent No. 2,735,812, however, other spacing means may be used.

The membranes are spaced and separated at their edges by gaskets made from insulating material such as soft rubber, polyvinyl chloride, polyethylene and like material, which has some resiliency, whereby a water-tight seal can be made between the gaskets and the edges of the membranes when pressure is applied around the edge of the membrane stack.

The supply lines and the discharge lines for the liquid to the concentrating cells and diluting cells are in the form of separate manifolds, each connected with the desired series of cells, such as the series of diluting cells or with the series of concentrating cells. These manifolds may take the form of pipe lines outside of the membrane stack, and connected with the cells by apertures through the gaskets. Preferably, however, the liquid supply lines consist of a series of holes through the gaskets and membranes of the membrane stack or of a series of holes in the membranes only, as described in the U.S. patent application No. 380,831, wherein each manifold is formed by a series of holes in the membranes and is connected with one series of the cells by resilient perforated separators which are placed between each alternative pair of membranes and press against each of the borders around the holes of any other alternative pair of membranes, to prevent liquid flow or leakage between the manifold for one series of cells and the interior of the other series of cells. In this way connection between the desired cells is established inside the apparatus and exterior manifolds are rendered unnecessary.

Apparatus of such type are well known today and are excellently suitable for desalting or other dialysis operations. The area of the membranes and the number of the membranes which can be used in these apparatus is, however, quite low and, therefore, the apparatus is of low capacity. Up to now such apparatus generally did not contain more than about 100 membranes of about 10 x 20 inch, and the total output of such a unit is, therefore, rather limited.

When, however, attempts are made to combine large numbers of membranes to provide larger electrodialysis units, such as units having 200 or more membranes, and especially if the area of the membranes is increased such as by the use of membranes of a size of 16 x 60 inches, great difficulty is encountered in sealing between the edges of the membranes and the gaskets and in preserving the alignment of the membrane stack and therefore of the holes through the membranes which provide communication between the cells within the apparatus.

One of these difficulties is that on application of a high pressure on the ends of the membrane stack to tighten the joints between the gaskets and membranes to obtain a water-tight apparatus, the membrane stack is inclined to bend. A further difficulty is that in membrane stacks of more than about 200 cells if such bending occurs, even distribution of the diluting liquid and of the concentrating liquid in the cells is difficult, and the rate of flow of the liquid in various cells is widely different.

It is the object of this invention to provide a multi-cell electrodialysis apparatus in which membrane stacks of more than 100 large size membranes may be combined into an electrodialysis unit which does not leak and which will not bend and cause ununiformity of flow and spacing between the membranes when a high pressure is applied to the edges of the stack to seal the same against leakage.

Another object of the invention is to provide a large capacity electrodialysis apparatus combining anion and cation permeable membranes of large size, e.g. 16 x 60 inches or larger, with soft sealing gaskets therebetween, and with large numbers of such membranes and gaskets, e.g. 100 or more, which can be rendered water-tight by applying pressure to seal the edges of the membranes between the gaskets without causing bending of the membrane stack and misalignment of the holes providing communication between the different cells in the apparatus.

Various other objects and advantages of the invention will appear as this description proceeds.

We have found that it is possible to prevent bending and deformation of a membrane stack comprising more than 100 large size membranes and gaskets of deformable material by interposing after each set of between about 20 and about 50 gaskets and membranes special rigid frames extending outward from the membrane stack and slidingly mounted on rigid supporting rails or rods outside of the membrane stack and perpendicular to the membranes, which rods or tracks maintain the rigid frame members in alignment.

Preferably these rigid separating and supporting frames consist of rigid cell frame members of a suitable insulating material and of substantially the same size and shape as the deformable gaskets but having extensions extending outside of the membrane stack and having a sleeve mounted on the said extensions of the rigid frame surrounding the next set of 20 to 50 normally deformable gaskets and the membranes therebetween. However, as will be obvious such surrounding frames are not essential, and the object of preventing bending of the membrane and gasket stacks can be accomplished by merely providing rigid members of substantially the size and shape of the gaskets, separating every 20 to 50 membranes, and providing extensions on these rigid frame members which extend outwardly from the membrane stack and slide upon rigid rods or tracks outside the membrane stack, which prevent the said rigid members, and hence the intervening membrane stacks, from bending out of alignment when put under sealing pressure.

Referring now to the drawings which illustrate a preferred embodiment of our invention without, however, intending to limit the invention thereto, FIG. 1 is a part diagrammatic section of an apparatus according to the invention;

FIG. 2 is an enlarged view showing how certain of the membranes are pressed together adjacent the holes passing therethrough to seal the membranes and provide internal communicating passages connecting the desired cells together;

FIG. 3 is a side view of an apparatus in operational position;

FIG. 4 is an end view of the apparatus illustrated in FIG. 3;

FIG. 5 is a cross-section along the line V—V of FIG. 3;

FIG. 6 is a reduced scale front view of one form of rigid frame construction for slidingly supporting the rigid separating members for the membrane stack;

FIG. 7 is a front view of a "barring" frame in which frame the supply and discharge channels through the membrane stack are barred;

FIG. 8 is a cross-section along the line VIII—VIII of FIG. 7;

FIG. 9 is a schematical side view of another embodiment of an electrodialysis apparatus having intermediate frames with side supply and outlet pipes;

FIG. 10 is a side view partly in section of a cell frame having separate side supply and outlet pipes;

FIG. 11 is a face view of the frame of FIGURE 10;

Figure 12:
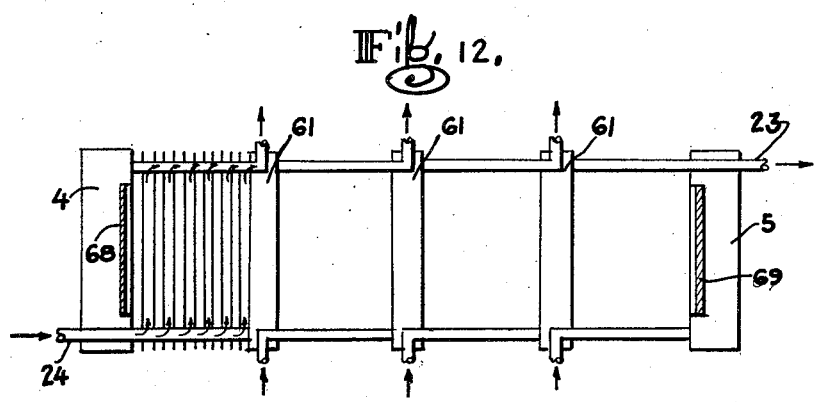
FIG. 12 is a schematical diagram showing the course of the dialysate in the apparatus of FIGURE 9.

FIG. 1 shows an enlarged section of a part of a membrane stack with alternatively anion permeable membranes 101 and cation permable membranes 102 forming alternate concentrating cells and diluting cells therebetween. At the border, these membranes are spaced and sealed by gaskets 103 of sufficiently compressible material to form a water-tight seal with the edges of the membranes 101 and 102 when put under moderate compression. A rigid frame 104 of sheet metal or other rigid material is placed between every 20 to 50 gaskets. If of sheet metal, frames 104 are provided with an insulating coating. A part 105 of this frame extends out of the membrane stack at each side of the apparatus. These extensions 105 are provided with perforations or holes or feet adapted to slide horizontally on rigid rods or tracks 106 which are in a fixed position and prevent any transverse movement of the rigid frames 104, but allow these frames to slide in a direction parallel to the supporting rod or tracks 106. In the embodiment illustrated in FIG. 1 a bearing 107 is welded on the extension 105 of frame 104 to insure parallel movement of the frames 104. When outside pressure is applied to a membrane stack to seal the cells by pressing the membranes and the gaskets together, the intermediate frames 104, supported by the rods or tracks 106, will prevent bending or deformation of the membrane and gasket stack.

As illustrated in the enlarged detail of FIG. 2 the membranes 101 and 102 are provided with holes 108 therein and certain of the membranes are pressed together by washers 109 and springy or corrugated resilient material 110 to separate the cells into alternate dialysate chambers 111 and rinsing chambers 112. The membranes are also kept spaced apart by corrugated perforated spacing inserts 113 as described in said U.S. Patent No. 2,735,812. If desired the passages formed by aligned holes 108 may be blocked at certain membranes as illustrated at 109a to cause dialysate and rinsing liquid to flow through desired groups of cells. As will be apparent, with internal passage formed in this way and with membranes separated by corrugated perforated spacing inserts, it is essential to prevent bending of the membrane and gasket stack, when placed under sealing pressure, as such bending would seriously disturb the liquid flow and electrical characteristics of the cell.

In the enlarged detail of FIG. 2 the conduits 114 and 114a formed in the membranes, communicates only with the rinsing chambers or cells 112. The similar conduit formed through the opposite corner of the membranes is caused to communicate with the dialysate cells 111 by arranging the washers 109 and resilient spacers 110 to separate the membranes on each side of the dialysate cells and press the membranes forming the rinsing cells together. As illustrated in FIGS. 3 and 4 the dialysate preferably enters the dialysate cells through a conduit formed in the membranes adjacent one corner and leaves through a conduit adjacent the diagonally opposite corner so as to flow upwardly or downwardly across the cell, and the course of the rinsing or diluting liquor is similar.

FIGS. 3 to 8 inclusive, show a typical form of electrodialysis apparatus in which the membrane and gasket stacks of the type illustrated in FIGS. 1 and 2 are used. In this apparatus the frame 1 consists mainly of angle steel beams 2 and 3, an end plate 4 composed of angle steel and steel plates and an end plate 5. The frame 1 is pivotally mounted on a pedestal 6 and normally rests in the position shown on support 7. The membrane and gasket stack is held together between the two end plates 4 and 5 by a plurality of draw-bars 8 and nuts 9 and 10. The draw-bars 8 extend beyond the nuts 10 to a compressing frame formed of angle beams 11 and 12 and are secured to this frame by means of nuts 13 and pins 14. Beams 11 support three plungers 15 and cylinders 16 for hydraulically pressing the membrane-gasket stacks into the desired operational position. The cylinders 16 are filled with a suitable liquid and are connected by conduits (not shown) with a pump or other suitable mechanism, providing the necessary pressure and with a regulating mechanism for regulating the amount of pressure liquid to each cylinder as is known per se in the field of hydraulic pressing. Pins 17 are provided to hold the bars 8 against turning in end plate 4 and end plate 5 is slidable along bars 8. When the membrane stack has been compressed to the desired degree it is held in this compressed condition by nuts 10 on the rods 8.

The end plates 4 and 5 are provided with the connections 18 and 19 for the electrical current to the anodes and cathodes and with means for connecting supply and discharge pipes 20, 21, 22 and 23 for the effluent or diluting liquids and 24, 25, 26, 27 for the dialysate. Separate connections 28 and 29 are provided for the separate supply and discharge of rinsing liquids for the electrode chambers, which electrode chambers are positioned directly behind each end plate.

In the embodiment shown in FIG. 4 of the drawings, said connecting devices 28 and 29 each contain two separate openings, which arrangement makes it possible to rinse the electrode chambers with two separate rinsing liquids, said electrode chambers then being divided into at least two separate compartments by means of membranes or diaphragms. Obviously, other arrangements for rinsing the electrode chamber can be used such as shown for example in U.S. patent application Serial No. 380,831.

FIG. 5 shows the end plates 4 and 5 and the interior of the membrane stack in greater detail. As here shown the end plates 4 and 5 comprise steel plates 30 and 31 and angle irons 32. Plates 31 have cylindrical extensions 33 projecting therefrom to receive the liquid connecting devices. Insulating plates 34 separate the end plates 4 and 5 from the electrode chambers 35 and 36 respectively.

Said electrode chambers may be of any suitable construction, e.g. as shown diagrammatically in application Serial No. 380,831, but in the drawing of the present apparatus the connections for the electric current are shown to extend through the end plates at 18 and 19.

A connecting flange 37 having an enlargement or collar 37ª extends from the electrode chambers 35 and 36 through the end plates 4 and 5 and externally threaded press-nuts 38 provided with octagonal heads 41 are provided to resiliently push the connecting flanges 37 and collars 37ª against the membrane stack. Press-nuts 38 cooperating with springs 39 are screwed into internal threads in cylindrical extensions 33. Packing rings 40 prevent leakage of liquid between electrode chamber frames 35 and 36 and connecting flanges 37. However, any other suitable construction for the connecting of the said channels to liquid inlet and outlet pipes may be used.

Rods 42 of a suitable rigid resinous or inert material separated by distance pieces or spacers 43 and 44 fused or welded thereto, are mounted in channels 25–26 and 24–27. These rods 42 are arranged in star-form and extend into and fit closely in the channels formed by the successive holes in the membranes in membrane stacks 49. They, therefore, hold the openings in the membranes in alignment and promote flow of dialysate and rinse liquids to the cells formed by the membranes. The boxes 45 form special cell frames which extend around the membrane stacks 49 shown only schematically in FIG. 5. The membranes consist of alternate anion permeable and cation permeable films with substantially rectangular gaskets therebetween as illustrated in enlarged detail in FIG. 1. The sides of the boxes 45 are formed with a flange-like member 48 extending parallel to the edges of the membrane stack. Member 48 is preferably made of metallic material provided with an insulating coating. Rigid frames 46 of FIGS. 5 and 6 are similar to frames 104 of FIG. 1 and cooperate with rails 3 to prevent bowing of the membrane stack under pressure. Obviously frames 46 may also be constructed of metal with an insulating coating, but as said frames come into contact with rinsing liquid or dialyzing liquid during operation of the apparatus, and as the electric current passes through the apparatus, it is safer to make said frames of rigid insulating material. The extensions of the frames 46 are shaped to glide between beams 3 (FIG. 6), forming two pairs of rails at the top and bottom of the apparatus as illustrated in FIGS. 3 and 6, also being coated at the contacting surface with an insulating coating 50.

Thus in the embodiment of FIG. 1 and of FIGS. 3–8, the membrane and gasket stack is provided between every 20 to 50 membranes with a rigid insert frame 104 or 46 riding on rails 106 or 3 respectively, which prevent the insert frames, and hence the membrane stacks therebetween, from bowing out of alignment in either a vertical or horizontal direction.

When the apparatus of FIGS. 3 to 8 is assembled, end plate 4 with electrode cell 35, provided with a suitable electrode, is placed horizontally, the beams 3 stand upright. Four sets of spacing rods 42 are put in place (i.e. in the four connecting flanges 37 of channels 20, 21, 24, 25). The first rigid frame 46 and box 45 is put in place and filled with the desired number of membranes and their gaskets and other necessary auxiliary parts. Another separating plate 46 (or 104) and another box 45 is put in place and filled with the desired number of membranes and gaskets, and this process is continued until a unit of the desired size and capacity has been built up. The number of membranes and gaskets inserted in each box 45 is such that the membrane stack in each box is slightly higher than the depth of the box, so that upon compression of the membrane and gasket stacks there is sufficient space between the top of one box 45 and the next adjacent frame 46 to permit sufficient compression of the membrane and gasket stacks to provide a tight seal around the edge of each membrane and the gaskets in contact therewith. We have constructed an apparatus of 400 cells, with each membrane 16 x 60 inches. Such apparatus contains 8 boxes (45) so that each box contains 50 cells. After four boxes have been stacked, a box with a frame 47 is put in place. In frames 47 the frame is extending at 56 into the interior of the cell so that inflow and outflow channels are barred. But a provision is made for a connection between separate sets of bars 42 and 53 respectively.

Distance pieces 44 are provided with a central extension 51 which passes through holes 52 in the extension 56 of frame 47. Another set of spacing rods 53 having at their ends a distance piece 54 providing a female joining member is adapted to be fixed to said extension 51. In order to be able to use only part of the total amount of membranes to form separate dialysis units the rods 53 are not made of the entire length required for the complete apparatus, but each rod can be provided with lengthening pieces 55 by means of male and female joints. If desired more spacing members 43 can be arranged along the length of these rods to hold them properly spaced apart. Rods 53 as well as each lengthening piece may advantageously be of such a length that they just traverse two successive boxes. As frame 47 also serves as an end cell frame the extension 56 comprise thinner parts 57 so that liquid can pass from one of the channels 26 or 27 into the interior of said cell and can pass from the cell into one of the channels 23 or 22, and hence out of the apparatus without traversing the entire membrane stack.

When all the boxes and cells have been stacked horizontally as described, end plate 5 with electrode cell 36 is put in place. As cylinders 16 are secured to end plate 5 the plungers 15 and beams 11–12 are put in place. Bars 8 are inserted into spaces 58 (FIG. 4) formed by three pairs of U-shaped beams 11 and fastened therein by means of pins 14, pins 17 serving to keep the bars 8 between similar U-shaped extensions 60 of plate 4. Then beams 2 are put in place and fastened.

By means of hydraulic pressure plate 5 is pressed down over a calculated length to compress the membrane and gasket stack and seal the edges thereof. Nuts 10 are secured and the hydraulic pressure is released.

The apparatus is then swung about its pivot on pedestal 6 from the horizontal to a vertical positon for electrodialyzing which electrodialyzing can be started when the necessary liquid connections and electric connections have been made.

In demounting the apparatus the hydraulic pressure cylinders can be used to aid in relieving the pressure to permit unscrewing of nuts 10.

The operation of a multi unit cell is illustrated in FIGS. 9 to 13 inclusive. In the apparatus shown in FIG. 9 eight "boxes" are mounted in total just as in the apparatus of FIG. 3, but three thicker separating frames 61 are provided one between each set of two boxes and the separating frames 61 are provided with side inlet and outlet connections 66 and 67.

FIGS. 10 and 11 show a frame 61 in which by means of two corner protrusions 62, two of the four "channels" for the liquids perpendicular to the membranes can be barred. The cross section of said channels are shown in dotted lines. Concentrically with said dotted lines are provided holes 63 serving for the same purpose as holes 52 in frames 47 (FIG. 7).

Within the area of the said channels, so within the dotted lines, cross-holes 64 are provided, which are connected with bores 65 and outward connection pipes 66 and 67 respectively.

Figure 13:
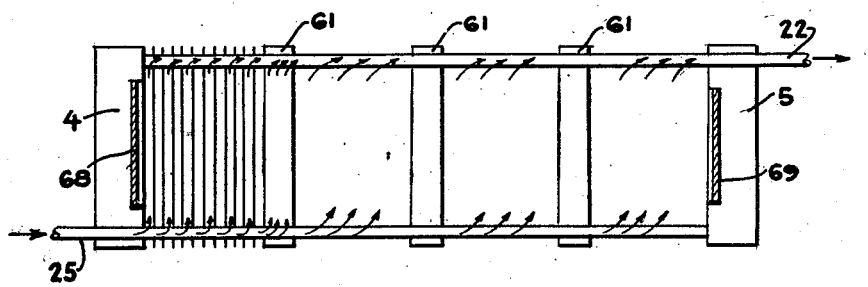
FIG. 13 is a schematical diagram showing the course of the rinsing liquid in the apparatus of FIGURE 9.

The courses of the dialysate and rinsing liquids in the embodiment of FIG. 9 are shown in FIGS. 12 and 13 respectively. With this embodiment of the invention it is possible to pass the dialysate four times in succession through (part of) the apparatus, without recirculating the dialysate through the complete apparatus.

To attain this, in each frame 61 the supply and outlet pipes 66 and 67 are connected to each other by an outward duct (not shown in the drawing) and in each of the frames 61 holes 63 are barred on one of their ends by means of an appropriate disk having a central slug corresponding with holes 62. In this way the dialysate and rinse liquid which has passed through one series of cells can be passed through other cells in the same unit to permit greater depletion or concentration of ions as between the respective liquids.

While we have described preferred embodiments of our apparatus in which the rigid tracks are located outside the membrane stack it will be understood that rigid rods or track similar to 3 or 106 could be passed through the edges of the membrane stack and the edges of the rigid supporting plates 46 or 105 or that a single rigid rod or track could be passed through the center of the membrane stack and the rigid supporting plates. These obvious variations would, however, be more difficult to seal against leakage outside the cells and between cells. It will also also be understood that other embodiments may be used and that various other modifications and changes may be made in the apparatus illustrated, without departing from the spirit of our invention or the scope of the following claims.

We claim:
1. A multi-cell electrodialyzing apparatus comprising a plurality of alternately arranged anion permeable and cation permeable membranes, gaskets of deformable material around the edge of each membrane, forming a membrane and gasket stack, four conduits, two for dialysate and two for rinse liquids formed within the membranes of said membrane and gasket stack by a series of four registering holes in said membranes in cooperation with ring members and resilient spaces between alternate series of membranes and around said holes to separate the membrane stack into alternate concentrating and diluting cells interconnected alternately with said two dialysate and said two rinse liquid conduits, a rigid end plate at each end of said membrane stack, dialysate and rinse liquid connections to said dialysate and rinse liquid conduits in said membrane stack, a plurality of rigid frame-like intermediate plates positioned between two of said deformable gaskets and interposed between each set of between about 20 and 50 membranes, said intermediate plates extending outside the membrane and gasket stack, rigid tracks outside said membrane and gasket stack and outside said rigid intermediate plates, means on said rigid intermediate plates to cooperate with the slide along said rigid tracks whereby said rigid intermediate plates are kept in alignment and said membrane and gasket stack can be compressed by moving said end plates toward each other without bowing of said membrane and gasket stack, means to prevent passage of electric current from said rigid intermediate plates to said rigid tracks, some of said rigid intermediate plates having means to bar the passage of liquid through at least two of said conduits to adjacent anion permeable and cation permeable membranes, said liquid-impermeable rigid intermediate plates dividing said membrane stack into at least two cell units having dialysate and rinse liquid connections to each of said cell units, an anode electrode at one end of said apparatus, a cathode electrode at the other end of said apparatus and means to pass a dialyzing electric current through such apparatus between said electrodes.

2. The apparatus of claim 1, wherein each of said cell units contains about 200 of said anion permeable and cation permeable membranes.

References Cited by the Examiner
UNITED STATES PATENTS

| | | | |
|---|---|---|---|
| 2,225,024 | 12/40 | Weber | 204—180 |
| 2,594,518 | 4/52 | Teale | 210—231 |
| 2,758,083 | 8/56 | Van Hoek et al. | 204—180 |
| 2,767,135 | 10/56 | Juda et al. | 204—180 |
| 2,784,158 | 3/57 | Bodamer et al. | 204—301 |
| 2,933,444 | 4/60 | Bott | 204—301 |

FOREIGN PATENTS 551,864  6/32  Germany.

OTHER REFERENCES

Ind. & Eng. Chem., Horner et al., vol. 47, No. 6, June 1955, page 1127.

JOHN H. MACK, *Primary Examiner*.

JOHN R. SPECK, JOSEPH REBOLD, WINSTON A. DOUGLAS, *Examiners*.